(No Model.)
S. H. KIMBALL.
WHEEL.
No. 487,017. Patented Nov. 29, 1892.
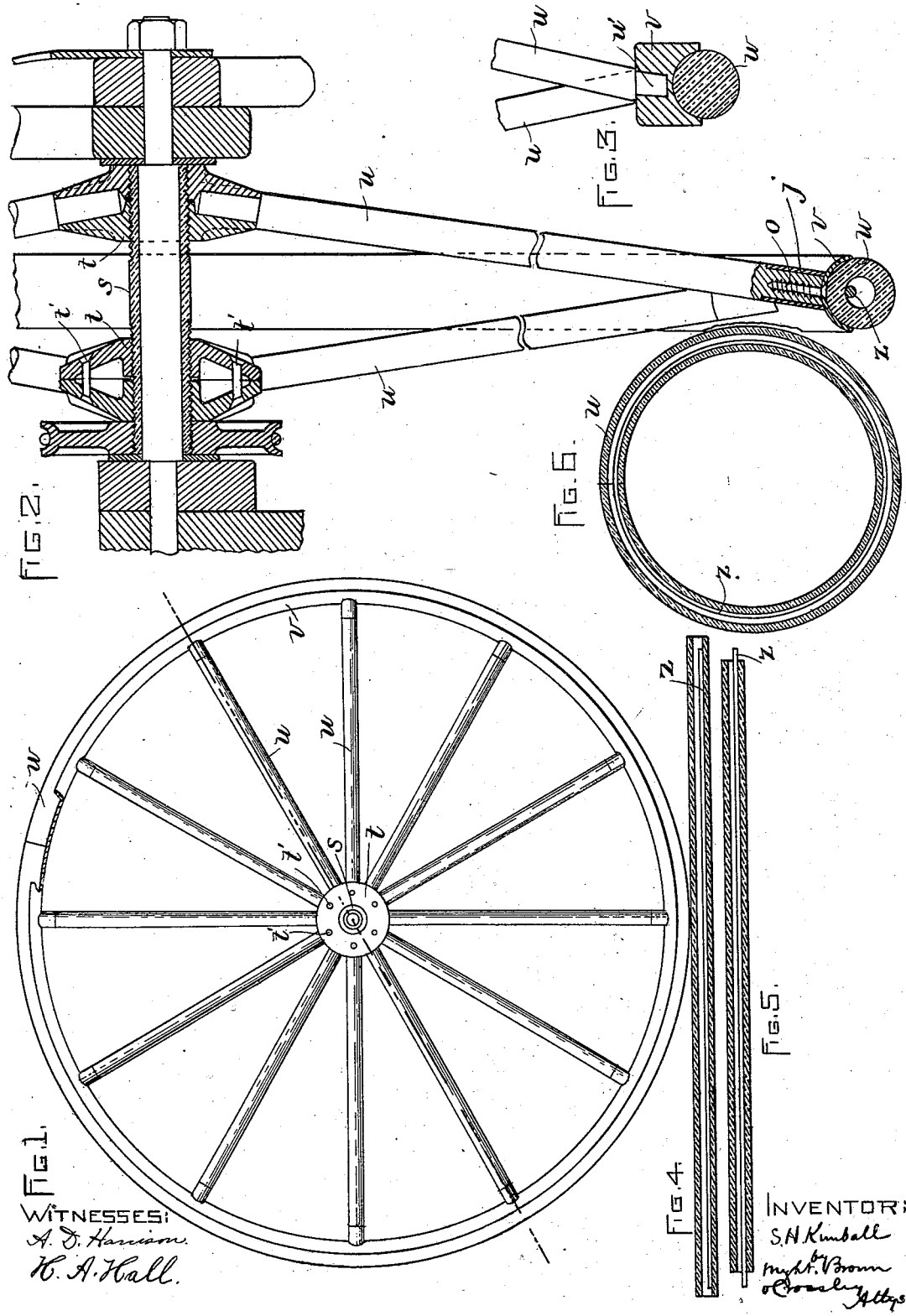
Witnesses:
A. D. Harrison.
H. A. Hall.
Inventor:
S. H. Kimball

UNITED STATES PATENT OFFICE.

STEPHEN H. KIMBALL, OF EVERETT, MASSACHUSETTS.

WHEEL.

SPECIFICATION forming part of Letters Patent No. 487,017, dated November 29, 1892.

Application filed January 25, 1892. Serial No. 419,191. (No model.)

*To all whom it may concern:*

Be it known that I, STEPHEN H. KIMBALL, of Everett, in the county of Middlesex and State of Massachusetts, have invented certain new and useful Improvements in Wheels, of which the following is a specification.

This invention relates to wheels provided with rubber tires and adapted for use in bicycles, invalid-chairs, &c.

The invention has for its object to provide a wheel of simple and durable construction and in which the spokes can be readily tightened to afford firm support for the rim.

The invention consists in the improved wheel, which I will now proceed to describe.

Of the accompanying drawings, forming part of this specification, Figure 1 represents a side view of a wheel embodying my invention. Fig. 2 represents a sectional view of a portion of the wheel on a larger scale than that shown in Fig. 1. Fig. 3 represents a sectional view showing the form of the rim when the latter is constructed of wood. Figs. 4, 5, and 6 are views showing the manner of making the tire.

The same letters of reference indicate the same parts in all the figures.

The hub portion of my improved wheel is composed of a tubular sleeve $s$, having its ends externally screw-threaded, with a right thread at one end and a left thread at the other. Upon each end of said sleeve is screwed a collar $t$, adapted to receive the inner ends of the spokes of the wheel. Each collar $t$ is made in two parts, as shown in Fig. 2. The two parts of each collar $t$ are securely bolted or riveted together, and are provided with sockets to receive the ends of the spokes $u$. Each alternate spoke is socketed in the left or right collar, respectively, as is usual in wheels of this class. The ends of the spokes are received between the two parts forming each collar, one part forming one side of the socket, while the other part forms the other side. The bolts $t'\ t'$, connecting the two parts of each collar, are located between the points where the spokes enter the collar. The parts of the collar are preferably of metal, and are made so as to have solid portions at the points where the sockets for the spokes are made and to have hollowed-out portions intermediate thereof, as will be readily understood from Fig. 2. This construction not only lightens the structure, but gives it a suitable spring, whereby when the two parts of the collars are riveted or bolted together at points intermediate of the spokes, as described, they will be enabled to hold the ends of the spokes firmly in their sockets.

The central or unthreaded portion of the sleeve $s$ may be made square, hexagonal, or of other suitable form to be engaged by a wrench, or it may be provided with holes adapted to receive the projecting fingers of a spanner, whereby the sleeve may be turned. The left and right threads on the ends of said sleeve enable the same to draw the two collars $t\ t$ together when the sleeve is turned and the wheel held, thus tightening up the wheel and rendering it properly rigid.

The rim $v$ of the wheel is made in a single piece and of rigid construction. It may be of metal or wood, the rim being formed as shown in Fig. 2 when made of metal and as shown in Fig. 3 when made of wood. In either case, the piece of metal or wood forming the rim is suitably united at its ends to form a ring which is practically rigid and incapable of being expanded or contracted. The other surface of the rim is grooved to receive a rubber tire $w$. When the rim is made of metal, the outer ends of the spokes are preferably attached to the rim by means of screws $o$, extending from the outer surface of the rim through the latter into the ends of the spokes, as shown in dotted lines in Fig. 2, the spokes being provided with ferrules $j$ to prevent splitting. When the rim is made of wood, it is preferably provided with sockets to receive the tenoned ends $u'$ of the spokes, as shown in dotted lines in Fig. 3.

It will be seen that by making the rim of the wheel in one piece, adapted to hold a rubber tire, and free from liability to become inoperative by contracting or expanding, I simplify and cheapen the construction of the wheel as compared with wheels in which the rim is made in a series of sections or fellies, a sectional rim requiring to be held by an encircling tire or band of rigid material, which is not required in this case, the continuous rim answering the purpose of both the sectional rim and the encircling tire.

I am aware that it is not new to make a wheel-rim in a single piece of metal formed with a grooved outer surface to receive a rubber tire; but I am the first, so far as I am aware, to combine in a wheel a rim made in a single piece and adapted to hold a rubber tire, with a hub having independently-movable spoke-receiving collars and two series of spokes connecting said collars with the rim, the spokes being arranged to exert an outward thrust against the rim by a movement of the said collars inwardly or toward each other.

The rubber tire $w$ is preferably formed in the following manner: I take a length of rubber tubing longer than the length required for the tire and insert in said tube a wire rod $z$, Fig. 4, of such length that when its ends are united it will form a ring or band of such diameter that it can be passed over either flange or raised side of the groove in the rim. The ends of the rubber tube are crowded back from the ends of the rod, Fig. 5, and the ends of the rod are united in any suitable way—such as by welding or riveting—to form a continuous hoop, Fig. 6, the tube being compressed longitudinally by the operation of forcing back its ends. When the ends of the rod have been united to form a hoop or ring, the tube is allowed to expand until its ends meet; but in consequence of the excess in length of the tube it remains in a state of compression, so that its thickness and elasticity are materially increased. This increase in the thickness and elasticity of the tube enables it to engage itself more securely with the grooved rim than would be the case if the tube had not been longitudinally compressed. The tube is forced laterally onto the rim of the wheel, the material of the tube inside the hoop yielding while passing over the edge of the rim and then expanding into the groove of the rim. Another advantage resulting from this improved tire is that the rubber, being in a state of compression, has no tendency to open or tear when a hole is cut in its surface. Ordinary tires are in an extended or stretched condition when on the wheel. Hence there is a tendency to enlarge any opening or hole that may be formed in it.

The improved tire constitutes one of the best forms of cushioned tires. The ends of the tube may be cemented to make the interior air-tight.

It will be seen that the arrangement of the spokes in two series, each spoke being arranged diagonally to the plane of the rim of the wheel, utilizes the longitudinal flexibility of the spokes in relieving the jar caused by riding over rough surfaces, each spoke being in position to spring to some extent under the longitudinal compressive strain exerted upon it. Hence the ends of the spokes are not battered by contact with their sockets, as they would be liable to be if they were in the plane of the rim of the wheel. The rim of the wheel when made of wood is also protected in the same way.

I claim—

The improved wheel hereinbefore described, the same consisting of the grooved rim made in one piece, the rubber tire inserted in the groove of said rim, the hub portion composed of the tubular sleeve and the spoke-receiving collars independently adjustable on said sleeve, the said collars having spoke-receiving sockets with solid bottoms, and the spokes arranged in two series with their ends abutting against the bottoms of said sockets and against the rim, whereby they are adapted to exert an outward thrust upon the rim by an inward movement of said collars, as set forth.

In testimony whereof I have signed my name to this specification, in the presence of two subscribing witnesses, this 16th day of January, A. D. 1892.

STEPHEN H. KIMBALL.

Witnesses:
C. F. BROWN,
A. D. HARRISON.